(12) United States Patent
Joehnck

(10) Patent No.: US 9,303,098 B2
(45) Date of Patent: Apr. 5, 2016

(54) CE(IV)-INITIATED GRAFT POLYMERISATION ON POLYMERS CONTAINING NO HYDROXYL GROUPS

(75) Inventor: Matthias Joehnck, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 414 days.

(21) Appl. No.: 12/994,914

(22) PCT Filed: May 5, 2009

(86) PCT No.: PCT/EP2009/003195
§ 371 (c)(1),
(2), (4) Date: Nov. 29, 2010

(87) PCT Pub. No.: WO2009/143953
PCT Pub. Date: Dec. 3, 2009

(65) Prior Publication Data
US 2011/0073547 A1    Mar. 31, 2011

(30) Foreign Application Priority Data

May 30, 2008 (EP) .................................. 08009923

(51) Int. Cl.
| | | |
|---|---|---|
| C08F 4/52 | (2006.01) |
| B01J 20/285 | (2006.01) |
| B01J 20/32 | (2006.01) |
| C08F 257/02 | (2006.01) |
| C08F 265/00 | (2006.01) |
| C08F 271/00 | (2006.01) |
| C08F 271/02 | (2006.01) |
| C08F 283/06 | (2006.01) |
| C08F 290/06 | (2006.01) |
| C08F 291/00 | (2006.01) |
| C08L 51/00 | (2006.01) |

(52) U.S. Cl.
CPC ................. *C08F 4/52* (2013.01); *B01J 20/285* (2013.01); *B01J 20/3278* (2013.01); *C08F 257/02* (2013.01); *C08F 265/00* (2013.01); *C08F 271/00* (2013.01); *C08F 271/02* (2013.01); *C08F 283/06* (2013.01); *C08F 290/06* (2013.01); *C08F 291/00* (2013.01); *C08L 51/003* (2013.01); *B01J 2220/82* (2013.01)

(58) Field of Classification Search
CPC .. B01J 20/285; B01J 20/3278; B01J 2220/82; C08F 4/52; C08F 257/02; C08F 265/00; C08F 271/00; C08F 271/02; C08F 283/06; C08F 291/00; C08F 290/06; C08L 51/003; C08L 2666/02

USPC .................. 210/635, 656, 659, 198.2, 502.1; 502/439
See application file for complete search history.

(56) References Cited

U.S. PATENT DOCUMENTS

| | | | | |
|---|---|---|---|---|
| 4,756,834 | A | * | 7/1988 | Muller et al. ................. 210/635 |
| 5,236,594 | A | * | 8/1993 | O'Reilly et al. .............. 210/656 |
| 5,453,186 | A | | 9/1995 | Muller et al. |
| 5,674,946 | A | * | 10/1997 | Muller .......................... 525/286 |
| 6,639,031 | B1 | | 10/2003 | Poetsch et al. |
| 2005/0065282 | A1 | * | 3/2005 | Ihre et al. ..................... 525/54.1 |
| 2006/0237367 | A1 | * | 10/2006 | Fisher et al. .................. 210/656 |
| 2008/0210615 | A1 | * | 9/2008 | Joehnck et al. ............ 210/198.2 |
| 2010/0181254 | A1 | * | 7/2010 | Graalfs ......................... 210/656 |

FOREIGN PATENT DOCUMENTS

| | | |
|---|---|---|
| DE | 4129901 A1 | 3/1993 |
| EP | 0337144 A1 | 10/1989 |
| EP | 0534016 A1 | 3/1993 |
| EP | 1051254 B1 | 8/2004 |
| EP | 1829611 A1 | 9/2007 |
| JP | 4-6463 A | 1/1992 |
| WO | 9614151 A1 | 5/1996 |
| WO | 9631549 A1 | 10/1996 |
| WO | 03031062 A1 | 4/2003 |

OTHER PUBLICATIONS

G. Mino and S. Kaizerman, Journal of Polymer Science, vol. XXXI, No. 122 (1958), pp. 242-243.*
Wikipedia, Acrolein, undated.*
Mueller, Werner. "New ion exchangers for the chromatography of biopolymers." (Journal of Chromatography.) pp. 133-140, 1990, No. 510.
Schmidt-Traub, Henner ed. "Preparative Chromatography." (Wiley-VCH Verlag Gmbh & Co. KGaA), pp. 183-189, 2005.
Schmidt-Traub, Henner ed. "Preparative Chromatography." (Wiley-VCH Verlag Gmbh & Co. KGaA), pp. 190-204, 2005.
Viklund, Camilla et al. "Preparation of Porous Poly(styrene-co-divinylbenzene) Monoliths with Controlled Pore Size Distributions Initiated by Stable Free Radicals and Their Pore Surface Functionalization by Grafting." (Macromolecules), pp. 4361-4369, 2001, No. 34.
Du, Kai-Feng et al. "Fabrication of high-permeability and high-capacity monolith for protein chromatography." (Journal of Chromatography A.) pp. 212-218, 2007, No. 1163.

(Continued)

*Primary Examiner* — Ernest G Therkorn
(74) *Attorney, Agent, or Firm* — Millen White Zelano and Branigan, PC; Csaba Henter; Anthony Zelano

(57) ABSTRACT

The invention relates to a process for the preparation of a separating material having improved binding capacity, and to materials prepared and to the use thereof for the separation of charged or uncharged biopolymers from liquids.

10 Claims, No Drawings

(56) References Cited

OTHER PUBLICATIONS

World IP Organization. "International Search Report." PCT/EP2009/003195, Applicant: Merck Patent Gesellschaft, Mailed: Jul. 24, 2009.
Espacenet Database. "English Abstract—Separation Materials." EP 0337144A1, Applicant: Merck Patent Gesellschaft, Oct. 18, 1989.
Espacenet Database. "English Abstract—Affinity carrier for fractionation of bio-polymers—comprises polyamide grafted with vinyl monomer carrying coupling side gps. and monomer with non-coupling gps." DE 4129901A1, Applicant: Detlef Mueller-Schulte, Mar. 11, 1993.
Espacenet Database. "English Abstract—Alkali-stable hydrophilic sorbents for ion-exchange chromatography." EP1829611A1, Applicant: Merck Patent Gesellschaft, Sep. 5, 2007.
Official Action related to corresponding Japanese Patent Application No. 2011-510858 dated Oct. 22, 2013.

\* cited by examiner

CE(IV)-INITIATED GRAFT POLYMERISATION ON POLYMERS CONTAINING NO HYDROXYL GROUPS

REFERENCE TO RELATED APPLICATIONS

This application is a 371 of PCT/EP2009/003195 filed May 5, 2009.

The invention relates to a process for the preparation of a novel separating material, and to separating materials prepared and to the use thereof for the separation of charged biopolymers from liquids.

PRIOR ART

Chromatography is one of the most suitable methods for the isolation of bio-polymers from liquids. Polymer-based chromatography materials, in particular, are advantageous in the purification of biopharmaceuticals compared with silica-based materials, since polymers can be prepared in such a way that they survive the cleaning of the filled chromatography column by means of sodium hydroxide solution which is necessary in the course of processing.

Besides hydrophobic interaction chromatography (HIC), size exclusion chromatography (SEC), mixed mode chromatography and affinity chromatography, ion exchange chromatography (IEX) is very frequently used. In addition, other types of chromatography, such as, for example, reversed phase chromatography, are also known. A review of various chromatography media and preparative chromatography methods is given, for example, in "Bioseparation and Bioprocessing", 2007, Editor Ganapathy Subramanian, Wiley-VCH Verlag GmbH & Co KGaA.

It has been known for many years that linear polymers which are obtained by grafting corresponding functionalised monomers onto a multiplicity of different surfaces are suitable for the generation of the desired functionality of the chromatography materials. If the functionalisation involves chemically bonded ionic groups, corresponding materials can be used for ion exchange chromatography (W. Müller, *J. Chromatography* 1990, 510, 133-140). A relatively large number of possible graft polymer structures which are intended for the fractionation of biopolymers is found in the patents EP 0 337 144 or U.S. Pat. No. 5,453,186. Graft polymers comprising more than one monomer unit, which are obtained by copolymerisation, are also known from the patent literature.

In the graft polymerisation initiated by Ce(IV) ions which is disclosed in EP 0337144 or WO 9614151, the presence of hydroxyl groups on the surface of the support material used is utilised in order to produce covalent bonds from the base support to the polymer. This method therefore appears only to be suitable for support materials which have hydroxyl groups on the surface under the given reaction conditions, but not for materials which lack these groups. The support materials used, to which chromatographically active groups are bonded by a Ce(IV)-initiated graft polymerisation, are usually inorganic support materials, such as, for example, $SiO_2$, $Al_2O_3$, MgO, $TiO_2$ or $ZrO_2$. In the case of these materials, it is even possible to increase the number of OH groups located on the surface in order to achieve denser coverage with reactive groups in a subsequent reaction (EP 1 051 254 B1). Owing to the reaction versatility of these oxidic, inorganic support materials, chromatography materials usually obtained by graft polymerisation are prepared using corresponding oxidic, inorganic support materials, in particular suitable silicates, or silica gels.

It is advantageous for a very wide variety of chromatographic separation problems to use chromatography materials prepared using organic support materials. This is particularly desirable if it is desired to prepare alkali, but also pressure-stable sorbents for chromatography which can be employed at high flow rates. These properties of the organic support materials must also be retained after derivatisation and must not be impaired.

EP 0337144 A1 or WO 96/31549 A1 discloses the use of support materials which have hydroxyl groups on the surface of the polymeric base support for Ce(IV)-initiated graft polymerisations for the preparation of ion exchangers. EP 0337144 A1 describes sorbents for ion exchange chromatography which are prepared using, inter alia, diol-substituted (meth)acrylate-crosslinked polymers as base materials onto which derivatised acrylamide monomers are grafted. The ion exchangers prepared in this way exhibit good separation properties and good pressure stability, but have limited stability to alkaline solutions. On the other hand, WO 03/031062 discloses the use of a crosslinked vinyl polymer containing diol groups as base material to which polymers are applied in a cerium(IV)-initiated polymerisation reaction.

An essential disadvantage of graft polymerisations on support materials which have hydroxyl groups consists in that the number of OH groups on the surface which are accessible to the reaction is limited. If it is desired to achieve greater coverage of the surfaces with grafted-on polymers, it is necessary, as described in (EP 1 051 254 B1), to increase the number of reactive OH groups by additional and preparative reaction steps.

By contrast, DE 41 29 901 A1 describes the use of polyamide particles as base material for graft-polymerised chromatography materials. In this case, the graft polymerisation is radiation-induced. However, this process is complex and time-consuming to carry out. Furthermore, the chromatography materials prepared on this basis are not suitable for all separation methods.

OBJECT TO BE ACHIEVED

The object of the present invention is therefore to provide a process which provides the possibility of preparing, in a simple and versatile manner, graft-polymerised chromatography materials on the basis of polymers which, although having no reactive hydroxyl groups on the surface, can, however, be derivatised in a simple manner in a graft polymerisation reaction which is initiated by Ce(IV) ions. A further object of the present invention is to provide a corresponding process which is simple and inexpensive to carry out and to provide chromatography materials having a broad application spectrum with respect to the possibility of separation of substance mixtures of a wide variety of origins, but also with respect to the stability to the influence of acids, bases, pressure or flow conditions.

SUBJECT-MATTER OF THE INVENTION

The present object is achieved by a novel process for the preparation of chromatography materials by the graft polymerisation of organic, polymeric base materials which are free from OH groups on the surface in the presence of a Ce(IV) initiator. The polymeric base material employed may comprise particulate polymers consisting of homopolymers or copolymers which are formed by the polymerisation of monomers containing vinyl groups and which contain no free hydroxyl groups. Monomers containing polyvinyl groups which are suitable for this purpose can be, for example, divinylbenzene, trivinylbenzene, divinyltoluene, divinylpyridine, divinylnaphthalene, ethylene glycol dimethacrylate, polyethylene glycol dimethacrylate, polypropylene glycol dimethacrylate, N,N-methylenebisacrylamide, N,N-divinylethyleneurea and N,N-divinylpropyleneurea. Monomers containing monovinyl groups, such as, for example, glycidyl methacrylate, methyl methacrylate, ethyl methacrylate, propyl methacrylate, butyl methacrylate, methyl acrylate, ethyl acrylate, propyl acrylate, butyl acrylate, acrylonitrile, N-vinylpyrrolidone, N-methyl-N-vinylacetamide, chlorostyrene or aminostyrene, are reacted exclusively in combination with one of the above-mentioned polyvinyl compounds for the preparation of the copolymers which are suitable in accordance with this disclosure. In a subsequent reaction, these polymer particles which contain no hydroxyl groups are graft-polymerised in a suitable manner.

The base materials employed which contain no hydroxyl groups preferably consist of particles having an average particle diameter in the range from 20 nm to 1000 μm. However, the graft polymerisation can also be carried out on the surface of shaped polymer bodies or on the surface of monolithic, porous polymer bodies, such as monolithic separating columns. Surprisingly, it is possible in accordance with the invention to derivatise the surface of the polymer materials described by Ce(IV)-induced graft polymerisation. The derivatisation can be carried out both on corresponding polymer particles and also on corresponding shaped monolithic polymer bodies. In particular, it is possible to derivatise the inner pore surface of both the macropores and mesopores of the support materials uniformly, including the inner pore surfaces of the polymer particles. However, polymeric separation membranes can also be treated in this way.

The derivatisation of the surface containing no hydroxyl groups can be carried out by means of graft polymers built up either from monomers of the same type or from at least two different monomer units. The preparation of the graft polymer covalently bonded to the surface of the separating material is preferably carried out using water-soluble monomer units of the general formula (1)

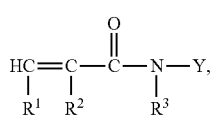

(1)

or of the general formula (2)

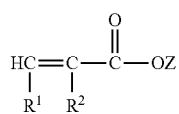

(2)

in which
Y denotes $R^4$—$SO_3M$
$R^1$ and $R^2$ independently of one another denote H, straight-chain or branched alkyl having 1 to 6 C atoms, carboxyl, carboxymethyl
$R^3$ denotes H, straight-chain or branched alkyl having 1 to 6 C atoms, Y
$R^4$ denotes straight-chain or branched alkylene having up to 8 C atoms, optionally mono- or polysubstituted by alkoxy or carboxyl groups and/or
arylene having up to 10 C atoms, optionally mono- or poly-substituted by alkyl, alkoxy or carboxyl groups, or methylene, ethylene, propylene, hexylene, isopropylene, isobutylene or phenylene
and
M denotes H, Na, K or $NH_4$ and
Z denotes Y.

A covalently bonded graft polymer of this type can likewise have been prepared using at least one water-soluble monomer unit of the general formula (1)

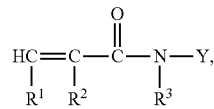

(1)

or of the general formula (2)

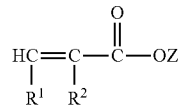

(2)

in which
Y denotes $R^5$—COOM
$R^1$ and $R^2$ independently of one another denote H, straight-chain or branched alkyl having 1 to 6 C atoms, carboxyl, carboxymethyl
$R^3$ denotes H, straight-chain or branched alkyl having 1 to 6 C atoms, Y
$R^5$ denotes straight-chain or branched alkylene having up to 8 C atoms, optionally mono- or polysubstituted by alkoxy or carboxyl groups and/or
arylene having up to 10 C atoms, optionally mono- or polysubstituted by alkyl, alkoxy or carboxyl groups, or methylene, ethylene, propylene, hexylene, isopropylene, isobutylene or phenylene
and
M denotes H, Na, K or $NH_4$ and
Z denotes M or Y.

Separating materials comprising graft polymers which have been prepared using at least one compound selected from the group of the methacrylamides, acrylamides or unsaturated carboxylic acids have particularly advantageous properties.

The present invention also relates to separating materials comprising graft polymers, as described above, which have been prepared using at least one compound selected from the group of the sulfoalkyl acrylates, such as 3-sulfopropyl acrylate or 2-sulfoethyl acrylate, vinylsulfonic acid, styrenesulfonic acid, allylsulfonic acid and vinyltoluenesulfonic acid, or from the group of the sulfoalkyl methacrylates, such as 2-sulfoethyl methacrylate or 3-sulfopropyl methacrylate.

In accordance with the invention, however, suitable derivatised separating materials can also be prepared using at least one compound selected from the group maleic acid, cinnamic acid, itaconic acid, citraconic acid, mesaconic acid or fumaric acid, or the group of the carboxyalkyl acrylates, such as carboxyethyl acrylate, or carboxyalkyl methacrylates.

Separating materials which are highly suitable for the purpose according to the invention can, in addition, be prepared if the graft polymers are prepared using at least one compound selected from the group carboxymethylacrylamide, carboxyethylacrylamide, acryloyl-gamma-aminobutyric acid and acryloylphenylalanine, acrylic acid, methacrylic acid and ethacrylic acid.

The present invention also relates to corresponding anion exchanger materials which are likewise obtained by graft polymerisation of suitable monomers on organic polymeric base materials which are free from OH groups on the surface.

Monomers for the preparation of anion exchanger materials according to the invention may, for example, carry primary, secondary or tertiary amino groups or be quaternary ammonium salts.

Suitable monomers containing amino groups are, for example, acrylates of the general formula (2)

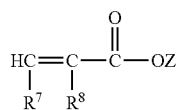

(2)

where $Z=R^4-NR^9R^{10}$,
in which $R^7$ and $R^8$, independently of one another, can have the meanings hydrogen or alkyl having up to 6 C atoms, preferably hydrogen or methyl, and in which $R^4$ can be a straight-chain alkylene group having 1 to 8 C atoms, such as, for example, methylene, ethylene, propylene or hexylene, or a branched alkylene group having 1 to 8 C atoms, such as, for example, isopropylene or isobutylene, and in which $R^9$ and $R^{10}$, independently of one another, have the meanings hydrogen, alkyl, phenyl or alkylphenyl, such as, for example, methyl, ethyl or benzyl. The aminoalkyl acrylates, such as 2-(diethylaminoethyl) acrylate, 2-(dimethylaminoethyl) acrylate or 2-(dimethylaminopropyl) acrylate, and the aminoalkyl methacrylates, such as 2-(diethylaminoethyl) methacrylate, 2-(dimethylaminoethyl) methacrylate or 3-(diethylaminopropyl) methacrylate, are mentioned by way of example.

Preference is given to the use of the acrylamides of the formula (1)

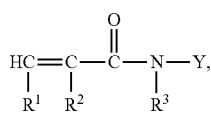

(1)

where $R^3=R^4-NR^9R^{10}$,
in which $R^1$, $R^2$ and Y, independently of one another, have the meanings hydrogen or alkyl having up to 6 C atoms, preferably hydrogen or methyl, and in which $R^4$ can be a straight-chain alkylene group having 1 to 8 C atoms, such as, for example, methylene, ethylene, propylene or hexylene, or a branched alkylene group having 1 to 8 C atoms, such as, for example, isopropylene or isobutylene, and in which $R^9$ and $R^{10}$, independently of one another, have the meanings hydrogen, alkyl, phenyl or alkylphenyl, such as, for example, methyl, ethyl or benzyl. Suitable acrylamides which may be mentioned here by way of example are 2-(diethylaminoethyl)acrylamide, 2-(dimethylaminoethyl)acrylamide, 3-(diethylaminopropyl)acrylamide or 3-(diethylaminopropyl)acrylamide, and suitable methacrylamides which may be mentioned here by way of example are 2-(diethylaminoethyl) methacrylamide, 2-(dimethylaminoethyl)methacrylamide, 3-(diethylaminopropyl)methacrylamide or 3-(diethylaminopropyl)methacrylamide.

Suitable monomers which are quaternary ammonium salts are, for example, acrylates of the formula (2)

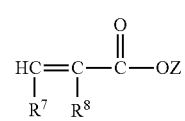

(2)

where $Z=R^4-NR^9R^{10}R^{11}X$, in which
$R^7$ and $R^8$, independently of one another, can have the meanings hydrogen or alkyl having up to 6 C atoms, preferably hydrogen or methyl, and in which $R^4$ can be a straight-chain alkylene group having 1 to 8 C atoms, such as, for example, methylene, ethylene, propylene or hexylene, or a branched alkylene group having 1 to 8 C atoms, such as, for example, isopropylene or isobutylene, and in which $R^9$, $R^{10}$ and $R^{11}$, independently of one another, have the meanings hydrogen, alkyl, phenyl or alkylphenyl, such as, for example, methyl, ethyl or benzyl. X is an anion and is selected in such a way that the monomer is water-soluble, and can be, for example, chloride or iodide. The acryloxyammonium salts, such as [2-(acryloxy)ethyl]trimethylammonium chloride, and methacryloxyammonium salts, such as [2-(methacryloxy)ethyl]-trimethylammonium chloride, are mentioned by way of example.

Preference is given to the use of the acrylamides of the general formula (1)

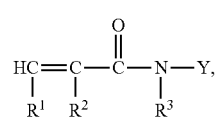

(1)

in which
$R^1$, $R^2$ and Y, independently of one another, have the meanings hydrogen or alkyl having up to 6 C atoms, preferably hydrogen or methyl, and in which $R^4$ can be a straight-chain alkylene group having 1 to 8 C atoms, such as, for example, methylene, ethylene, propylene or hexylene, or a branched alkylene group having 1 to 8 C atoms, such as, for example, isopropylene or isobutylene, and in which $R^9$, $R^{10}$ and $R^{11}$, independently of one another, have the meanings hydrogen, alkyl, phenyl or alkylphenyl, such as, for example, methyl, ethyl or benzyl. X is an anion and is selected in such a way that the monomer is water-soluble, and can be, for example, chloride, iodide or methylsulfate. Suitable acrylamides which may be mentioned here by way of example are 2-(acryloylaminoethyl)trimethylammonium chloride and 3-(acryloylaminopropyl)trimethylammonium chloride, and suitable methacrylamides which may be mentioned here by way of example are 2-(methacryloylaminoethyl)trimethylammonium chloride and 3-(acryloylaminopropyl)trimethyl-ammonium chloride.

Since it may be advantageous for separating off certain biomolecules for an interaction to take place with a hydrophobic component of the separating material, preference is also given to separating materials which have covalently bonded graft polymers on the surface and which are in turn prepared using at least one monomer unit having a pronounced hydrophobic content in the form of at least one alkyl or aryl group having a suitable number of carbon atoms and at least one further monomer unit which carries a charge. Separating materials of this type have proven particularly effective since they can interact with the biopolymer to be separated off both by means of the hydrophobic component and also by means of the charged component of the graft polymer.

Consequently, derivatisation using at least one monomer unit having a hydrophobic component, selected from the group of the alkyl vinyl ketones, aryl vinyl ketones, arylalkyl vinyl ketones, styrene, alkyl acrylates, aryl acrylates, arylalkyl acrylates, alkylaryl acrylates, alkyl methacrylates, aryl methacrylates, arylalkyl methacrylates and alkylaryl methacrylates is particularly desirable.

Particularly effective separating materials can also be prepared using at least one monomer unit of the general formula (1) having a hydrophobic component,
in which $Y=R^6$
and in which
$R^1$ and $R^2$ independently of one another denote H, unbranched or branched alkyl having up to 6 C atoms
$R^3$ and/or $R^6$ independently of one another denote H, unbranched or branched alkyl, aryl, alkylaryl, arylalkyl, where the alkyl group may carry oxo groups,
  where the alkyl and/or aryl group may be mono- or polysubstituted by alkoxy, phenoxy, cyano, carboxyl, acetoxy or acetamino groups,
  and where $R^3$ and $R^6$ together carry at least 6 C atoms.

Separating materials in accordance with the present invention can therefore be prepared using at least one monomer unit of the general formula (1) having a hydrophobic content, in which
$R^3$, $R^6$ independently of one another denote H, methyl, ethyl, propyl, butyl, pentyl, hexyl, heptyl, octyl, nonyl, decyl, 2-, 3- or 4-oxapentyl, 2-, 3-, 4- or 5-oxahexyl, 2-, 3-, 4-, 5- or 6-oxaheptyl, 3-butoxypropyl, isopropyl, 3-butyl, isobutyl, 2-methylbutyl, isopentyl, 2-methylpentyl, 3-methylpentyl, 2-oxa-3-methylbutyl, 2-methyl-3-oxahexyl, 2-phenyl-2-oxoethyl, phenoxyethyl, phenyl, benzyl, phenylethyl and phenylpropyl
  where $R^3$ and $R^6$ together carry at least 6 C atoms.

Separating materials according to the invention are accordingly also prepared using at least one of these monomer units containing a functional group having a charge and at least one monomer unit which contains a hydrophobic group which, besides the charge, imparts a hydrophobic character on the copolymer, and optionally at least one neutral monomer unit, which may be hydrophilic.

Particular preference is given to separating materials which have been prepared using at least one neutral monomer unit of the general formula (1), which may be hydrophilic,
where $Y=R^6$ and in which
$R^1$, $R^2$ independently of one another denote H or methyl
$R^3$, $R^6$ independently of one another denote H, alkyl, alkoxyalkyl, each having up to 4 C atoms.

Very particular preference is given to separating materials containing at least one neutral monomer unit, which may be hydrophilic, of the general formula (1)
where $Y=R^6$, in which
$R^1$, $R^2$ independently of one another denote H or methyl
$R^3$, $R^6$ independently of one another denote H, methyl, ethyl, butyl, isopropyl, 3-butyl, isobutyl, methoxyethyl or ethoxyethyl.

The graft polymer can also be prepared using at least one neutral monomer unit selected from the group acrylamide (Mm), dimethylacrylamide, methacrylamide, isopropylacrylamide, methoxyethylacrylamide and ethoxyethyl-acrylamide, or from the group methyl acrylate and methyl methacrylate, and using two or three monomers selected from the group 2-acrylamido-2-methylpropanesulfonic acid, acrylic acid, N-arylalkylacrylamides, such as benzylacrylamide and acryloylphenylalanine, N-carboxyalkylacrylamides, such as acryloyl-gamma-aminobutyric acid, and N-alkylacrylamides.

The present invention also relates, in particular, to separating materials comprising graft polymers, as described above, in which the ratio of the units which carry charges to the units containing aromatic groups is in the range between 99:1 and 10:90, preferably in the range between 96:4 and 40:60.

The actual graft polymerisation reaction according to the invention on surfaces containing no hydroxyl groups is initiated by cerium (IV) ions. This reaction is normally carried out in dilute mineral acids, such as, for example, in dilute nitric acid, in which hydrophobic monomers are insoluble or virtually insoluble. The reaction can also be carried out in dilute sulfuric acid or hydrochloric acid. However, it is preferably carried out in dilute nitric acid in a concentration in the range from 1 to 0.00001 mol/l. The addition of a solubiliser or co-solvent, preferably dioxane, enables a hydrophobic monomer to be dissolved and grafted. 0.05-100 mol of monomers are preferably employed per liter of sedimented support material.

The process according to the invention for the preparation of the separating materials is preferably carried out by
  a) dissolving a monomer in water, which is optionally mixed with further monomers,
  b) mixing the resultant solution with the support material in such a way that 0.05 to 100 mol of total monomer are employed per liter of sedimented polymer material,
  c) adding cerium(IV) salt dissolved in mineral acid to the resultant suspension, causing a pH in the range 0-5 to become established, and
  d) graft-polymerising the reaction mixture over a period of 0.5 to 72 hours.

The present invention thus also relates to the resultant separating material, which may be in the form of a chromatography column, and which has been derivatised in accordance with the invention by graft polymerisation.

The present invention likewise encompasses the use of the separating materials according to the invention for the separation of biopolymers from liquid media, in particular for the separation of protein from liquid media or for the separation of antibodies from liquid media. The separation is particularly selective if the biopolymer interacts with the ionic, hydrophilic and, where present, the hydrophobic groups of the graft polymer covalently bonded to the surface of the support material. The biopolymer is adsorbed here by interacting both with the charged component of the graft polymer and also with the hydrophobic component. The subsequent liberation of the adsorbed biopolymer which has been separated off from the liquid can be carried out by desorbing the biopolymer bound to the separating material by interaction with the ionic and, where present, hydrophobic groups again either
  a) by increasing the ion strength and/or
  b) by modifying the pH
  in the solution
  and/or
  c) by means of a suitable eluent having a different polarity from that of the adsorption buffer.

The described graft-polymerised separating materials according to the invention can also be described as polymers provided with separation effectors. They can be used for the selective, partially selective or non-selective binding or adsorption of one or more target components with the aim of separation from a matrix the selective, partially selective or non-selective binding or adsorption of one or more secondary components with the aim of separation of the secondary component from a matrix the separation of a substance mixture without binding or adsorption of one or more components merely on the basis of the molecular size by size exclusion chromatography the isolation, enrichment and/or depletion of biopolymers from natural sources the isolation, enrichment and/or depletion of biopolymers from recombinant sources the isolation, enrichment and/or depletion of biopolymers from immortalised cell lines and culture supernatants thereof the isolation, enrichment and/or depletion of biopolymers from B-cell lines and derivatives thereof, lymph cells and hybridoma cell lines and culture supernatants thereof the isolation, enrichment and/or depletion of proteins and peptides the isolation, enrichment and/or depletion of enzymes the isolation, enrichment and/or depletion of monoclonal and polyclonal antibodies and naturally occurring or recombinant antibody fragments the isolation, enrichment and/or depletion of phosphorylated peptides/proteins and nucleic acids the isolation, enrichment and/or depletion of food additives the isolation, enrichment and/or depletion of mono- and polysaccharides the isolation, enrichment and/or depletion of glycosylated proteins the isolation, enrichment and/or depletion of single-stranded or double-stranded DNA the isolation, enrichment and/or depletion of plasmid DNA the isolation, enrichment and/or depletion of RNA the isolation, enrichment and/or depletion of viruses the isolation, enrichment and/or depletion of host cell proteins the isolation, enrichment and/or depletion of oligo- and polynucleotides the isolation, enrichment and/or depletion of liposomes the isolation, enrichment and/or depletion of products from blood and milk the isolation, enrichment and/or depletion of low-molecular-weight active pharmaceutical ingredients (APIs)

the separation of an API from an API medicament carrier (for example an API-liposome adduct or an API-nanoparticle adduct)

the isolation, enrichment and/or depletion of enantiomers

Depending on the nature of the separation effectors, the use of the polymers according to the invention corresponds by way of example to affinity chromatography, ion exchange chromatography, hydrophobic interaction chromatography, size exclusion chromatography, chiral chromatography or mixed-mode chromatography or liquid-liquid partition chromatography.

The polymers according to the invention provided with separation effectors in accordance with the desired application can be used in known chromatographic methods in which a sorbent is used. These methods can basically be divided into discontinuous and continuous methods. Examples of discontinuous methods are mentioned in "Preparative Chromatography" (Ed. H. Schmidt-Traub, Wiley-VCH Verlag Weinheim, 2005, ISBN 3-527-30643-9, pages 183-189). Further examples are flash chromatography, expanded bed chromatography, inter alia. Furthermore, the polymers according to the invention, in their native form or provided with separation effectors in accordance with the application, can be used in continuous methods, such as, for example, simulated bed chromatography. Further examples of discontinuous methods are described in "Preparative Chromatography" (Ed. H. Schmidt-Traub, Wiley-VCH Verlag Weinheim, 2005, ISBN 3-527-30643-9, pages 190-204).

Both the continuous methods and also the discontinuous methods can be carried out, depending on the objective, either isocratically or using the gradient technique. The person skilled in the art is aware of how the sorbent according to the invention, in native form or provided with separation effectors, should be employed for the desired objective in one of the said methods.

The polymers according to the invention can also be used in thin-layer chromatography.

DETAILED DESCRIPTION OF THE INVENTION

Experiments have surprisingly shown that Ce(IV)-initiated graft polymerisation can also be carried out successfully on polymers containing no hydroxyl groups, enabling the preparation of novel graft-polymerised chromatography materials having improved properties.

Graft-polymerised chromatography materials having improved properties which correspond to the invention have been prepared, for example, by carrying out a Ce(IV)-initiated graft polymerisation on poly(methyl methacrylate-co-ethylene glycol dimethacrylate) backbones (poly(MMA/EGDMA), MMA/EGDMA-SO3 batch 06MJ-DZ109) or on poly(1-vinyl-2-pyrrolidone-co-1,3-divinylimidazolin-2-one) backbones (poly(NVP/DVH), DVH-SO3 batch 07MJ-DZ077) or on poly(ethylstyrene-co-divinylbenzene) backbones (poly-(ES/DVB)). The ion exchangers obtained in this way can be employed in the same way as ion exchangers prepared on base supports containing hydroxyl groups. In particular, they can be used like chromatography materials. Here, they are particularly suitable for the separation of charged or uncharged biomolecules from liquids.

The support materials used for carrying out the graft polymerisation can be employed in the form of particles or as monolithic mouldings. It is essential in this connection that the support materials have a porous structure. A bimodal pore structure is particularly desirable in this connection, where particles, but in particular monolithic mouldings have both macropores and mesopores. The separating materials according to the invention are preferably prepared using corresponding polymer particles having an average particle diameter in the range from 20 nm to 1000 µm. Monolithic, porous, polymeric mouldings which can be employed for the graft polymerisation according to the invention are mouldings having a diameter from a few millimeters to several centimeters and a corresponding length. A bimodal pore structure is particularly essential here, where corresponding materials having macropores having an average diameter of 200 nm to 100 µm, preferably 500 nm to 10 µm, and having mesopores having an average diameter of 1 to 50 nm, preferably 2 to 20 nm, can be derivatised by the graft polymerisation according to the invention to give separating materials having good separation efficiencies. The base materials employed are particularly preferably corresponding organic polymer particles having an average particle surface area in the range from 20 to 1200 $m^2/g$, preferably from 100 to 600 $m^2/g$.

The graft polymerisation according to the invention is preferably carried out in the presence of a cerium catalyst. Although various cerium(IV) salts, such as, for example, also ammonium cerium(IV) sulfate, have proven suitable as catalysts for this use, ammonium cerium(IV) nitrate is particularly preferably employed as catalyst for the graft polymerisations. In order to carry out the graft polymerisation, the catalyst is generally employed in a suitable amount, based on the total amount of monomers initially introduced, and the catalyst is added to the suspension of the initially introduced support material and the monomers if particulate support material is graft-polymerised. The catalyst is preferably added to the suspension of the reactants in an acidic aqueous solution. In order to prevent side reactions with atmospheric oxygen, the actual graft polymerisation is carried out under an inert gas. The reaction is preferably carried out under a nitrogen atmosphere. The reaction here is carried out with constant mixing of the reaction mixture, in particular with constant stirring. In order to carry out the polymerisation, the temperature is increased somewhat. The reaction is carried out, as already mentioned, in the presence of at least one inorganic acid selected from the group nitric acid, sulfuric acid and hydrochloric acid. The reaction is preferably carried out in the presence of nitric acid or sulfuric acid. Nitric acid is particularly preferably employed. The solvent used is preferably water. The reaction is advantageously carried out in the presence of a co-solvent. A particularly advantageous co-solvent has proven to be dioxane. However, other organic solvents, such as various alcohols, can also be employed. A suitable alcohol is, for example, dodecanol. However, alcohols having similar polarity can also be employed.

In order to carry out the polymerisation reaction, the pH in the initially introduced suspension is adjusted to a value in the range from 5.5 to 6.1, preferably in the range from 5.7 to 5.9, by addition of acid and a base, preferably NaOH or KOH, particularly preferably NaOH.

The resultant solution comprising the support material is mixed with an initially introduced amount of monomer solution in such a way that a ratio of 0.05 to 100 mol of total monomer per liter of sedimented polymer material arises. Cerium(IV) salt dissolved in mineral acid is added to this initially introduced suspension, causing the pH to be set in the range 0-5. The reaction mixture obtained is graft-polymerised over the course of 0.5 to 72 hours. During this time, the reaction solution is stirred vigorously.

The Ce(IV) ion-catalysed reaction is thus basically carried out in the presence of at least one inorganic acid. Although the reaction is preferably carried out in the presence of nitric acid, the above-mentioned acids can, however, also be employed as a mixture in the polymerisation reaction.

The particulate support material employed is sedimented polymer containing no hydroxyl groups.

"Sedimented polymer" or sedimented support material is taken to mean moist support material which is obtained by sedimentation from a suspension which has been freed from supernatant solvent. Corresponding support material is usually stored in the moist state. For the use according to the invention, supernatant solvent is removed in advance by suction. In order to carry out the derivatisation, a measured volume or weighed amount (filter-moist material) is subsequently suspended in a suitable volume or in a suitable amount of monomer solution and subjected to the graft polymerisation. The support material according to the invention is an organic, polymeric support material containing no hydroxyl groups.

For the graft polymerisation of an organic, monolithic, porous moulding, the procedure described is modified and a stream of a corresponding polymerisation solution is passed around the moulding, which is stored for an appropriate period.

When the graft polymerisation is complete, the separating material obtained is washed a number of times with dilute, acidic or basic solutions and can be introduced into a separating column immediately after suitable pre-treatment and employed for substance separation.

The present description enables the person skilled in the art to apply and carry out the invention comprehensively. Even without further comments, it is therefore assumed that a person skilled in the art will be able to utilise the above description in the broadest scope.

If anything should be unclear, it goes without saying that the publications and patent literature cited should be referred to. These documents are correspondingly regarded as part of the disclosure content of the present description.

For better understanding and in order to illustrate the invention, examples are given below which are within the scope of protection of the present invention. These examples also serve to illustrate possible variants. Owing to the general validity of the inventive principle described, however, the examples are not suitable for reducing the scope of protection of the present application to these alone.

It furthermore goes without saying to the person skilled in the art that, both in the examples given and also in the remainder of the description, the component amounts present in the compositions always only add up to a total of 100% by weight or mol %, based on the composition as a whole, and cannot exceed this, even if higher values could arise from the percent ranges indicated. Unless indicated otherwise, % data are taken to be % by weight or mol %, with the exception of ratios, which are shown in volume data, such as, for example, eluents, for the preparation of which solvents are used as a mixture in certain volume ratios.

The temperatures given in the examples and description and in the claims are always in ° C.

EXAMPLES

Example 1

Synthesis of the Base Support poly-MMA/EGDMA
(Internal EGDMA-L01)

2.4 g of polyvinyl alcohol 40-88 (Merck), 5.28 g of sodium sulfate (Merck), 0.36 g of tributyl phosphate (Merck) and 0.48 g of emulsifier E30 (Leuna Tenside) are dissolved in 1200 ml of water. This aqueous phase is warmed to 40° C. 2.4 g of AIBN (Merck) are dissolved in 120 g of toluene (Merck), 160 g of n-heptanol (Merck), 1 g of methyl methacrylate (MMA, Merck) and 120 g of ethylene glycol dimethacrylate (EGDMA, Merck) at room temperature (organic phase). The organic phase is rapidly added to the aqueous phase in an inertised polymerisation vessel with vigorous stirring. The mixture is heated to 65° C. over the course of 50 min. This temperature is maintained for 2 h, and finally the mixture is polymerised at 80° C. for a further 4 h. The organic solvents are substantially removed by steam distillation. The resultant polymer is washed with acetone and water on a suction filter. The surface area of the polymer is 488 m$^2$/g.

Example 2

Synthesis of the Base Support poly-NVP/DVH
(Internal: DVH-L06)

36 g of polyvinyl alcohol 40-88 (Merck), 36 g of sodium chloride (Merck) and 0.48 g of emulsifier E30 (Leuna Tenside) are dissolved in 1200 ml of water. This aqueous phase is warmed to 40° C. 1.2 g of AIBN (Merck) are dissolved in 260 g of butyl acetate (Merck), 1 g of N-vinylpyrrolidone (NVP, Merck) and 140 g of 1,3-divinylimidazolin-2-one (BASF) at room temperature (organic phase). The organic phase is rapidly added to the aqueous phase in an inertised polymerisation vessel with vigorous stirring. The mixture is heated to 65° C. over the course of 50 min. This temperature is maintained for 2 h, and finally the mixture is polymerised at 80° C. for a further 4 h. The resultant polymer is washed with acetone and water on a suction filter. The surface area of the polymer is 408 $m^2$/g.

Example 3

Synthesis of the Base Support poly-ES/DVB 19.8 g of magnesium hydroxide (Merck), 32 g of sodium sulfate (Merck) and 0.189 g of emulsifier E30 (Leuna Tenside) are dissolved in 1050 ml of water. This aqueous phase is warmed to 50° C. 1.05 g of AIBN (Merck) are dissolved in 185 g of toluene (Merck), 63 g of divinylbenzene (Aldrich) and 37 g of ethyistyrene (Aldrich) at room temperature (organic phase). The organic phase is rapidly added to the aqueous phase in an inertised polymerisation vessel with vigorous stirring. The mixture is heated to 72° C. over the course of 50 min. This temperature is maintained for 2 h, and finally the mixture is polymerised at 80° C. for a further 4 h. The organic solvents are substantially removed by means of steam distillation. The resultant polymer is washed with acetone and water on a suction filter. The surface area of the polymer is 596 $m^2$/g.

Example 4

Synthesis of a Strong Cation Exchanger According to the Invention Based on poly-MMMA/EGDMA Base Support Prepared in Accordance with Example 1 (Internal 06MJ-DZ109)

6.22 g of 2-acrylamido-2-methyl-1-propanesulfonic acid (AMPS, Merck) and 17 g of demineralised water are initially introduced in a 250 ml three-necked flask (dropping funnel, gas inlet tube and precision glass stirrer). The flask is cooled to 8° C. (with a gentle stream of nitrogen in order to prevent excessive accumulation of atmospheric oxygen in the solution). 2 ml of 2 M sodium hydroxide solution (Merck) are added, and a pH of 5.8 is set using nitric acid (65%, Merck). The flask is allowed to come to RT again and is flushed further with nitrogen. 20 ml of polymer prepared in accordance with Example 1 which has sedimented under gravity overnight are added to this solution. The mixture is made up to a total volume of 60 ml with demineralised water. The pH is reset to 5.8. 16 µl of dodecanol are also added. 1.4 g of demineralised water are mixed with 0.29 g of 65% nitric acid in a beaker. 0.66 g of ammonium cerium(IV) nitrate (Merck) is dissolved in this solution. The suspension in the flask is warmed to 42° C. The ammonium cerium(IV) nitrate solution is rapidly added to the suspension with vigorous stirring. After the addition of the ammonium cerium(IV) nitrate solution, the stirrer speed is immediately reduced so that the particles just remain in suspension. The mixture is stirred at this speed for 3 h. The suction-filter cake is subsequently washed with 3×125 ml of water, 5×15 ml of 1 M sulfuric acid/0.2 M ascorbic acid, 3×15 ml of demineralised water, 5×15 ml of 1 M NaOH, 3×15 ml of demineralised water, 3×15 ml of 1 M HCl and 3×15 ml of demineralised water on a 125 ml borosilicate 3.3 frit. The CHNS analysis of the dried product shows a sulfur content of 2.0% by weight.

Example 5

Synthesis of a Strong Cation Exchanger According to the Invention Based on poly-NVO/DVH Base Support Prepared in Accordance with Example 2 (Internal 07MJ-DZ078)

3.73 g of 2-acrylamido-2-methyl-1-propanesulfonic acid (AMPS, Merck) and 25 g of demineralised water are initially introduced in a 250 ml three-necked flask (dropping funnel, gas inlet tube and precision glass stirrer). The flask is cooled to 8° C. (with a gentle stream of nitrogen in order to prevent excessive accumulation of atmospheric oxygen in the solution). 2 ml of 2 M sodium hydroxide solution (Merck) are added, and a pH of 5.8 is set using nitric acid (65%, Merck). The flask is allowed to cool to RT again and is flushed further with nitrogen. 15 ml of polymer prepared in accordance with Example 2 which has sedimented under gravity overnight are added to this solution. The mixture is made up to a total volume of 90 ml with demineralised water. The pH is reset to 5.8. 24 µl of dodecanol are also added. 1.0 g of demineralised water is mixed with 0.44 g of 65% nitric acid in a beaker. 0.49 g of ammonium cerium(IV) nitrate (Merck) is dissolved in this solution. The suspension in the flask is warmed to 42° C. The ammonium cerium(IV) nitrate solution is rapidly added to the suspension with vigorous stirring. After the addition of the ammonium cerium(IV) nitrate solution, the stirrer speed is immediately reduced so that the particles just remain in suspension. The mixture is stirred at this speed for 3 h. The suction-filter cake is subsequently washed with 3×25 ml of water, 5×15 ml of 1 M sulfuric acid/0.2 M ascorbic acid, 3×15 ml of demineralised water, 5×15 ml of 1 M NaOH, 3×15 ml of demineralised water, 3×15 ml of 1 M HCl and 3×15 ml of demineralised water on a 125 ml borosilicate 3.3 frit. The CHNS analysis of the dried product shows a sulfur content of 2.2% by weight.

Example 6

Synthesis of a Strong Cation Exchanger Based on Poly-ES/DVB Base Support Prepared in Accordance with Example 3 (internal 07MJ-PP005)

15.55 g of 2-acrylamido-2-methyl-1-propanesulfonic acid (AMPS, Merck) and 34 g of demineralised water are initially introduced in a 250 ml three-necked flask (dropping funnel, gas inlet tube and precision glass stirrer). The flask is cooled to 8° C. (with a gentle stream of nitrogen in order to prevent excessive accumulation of atmospheric oxygen in the solution). 3 g of 32% sodium hydroxide solution (Merck) are added, and a pH of 5.8 is set using nitric acid (65%, Merck). The flask is allowed to cool to RT again and is flushed further with nitrogen. 50 ml of polymer prepared in accordance with Example 3 which has sedimented under gravity overnight are added to this solution. The mixture is made up to a total volume of 120 ml with demineralised water. The pH is reset to 5.8. 32 µl of dodecanol are also added. 6.75 g of demineralised water are mixed with 0.725 g of 65% nitric acid in a beaker. 1.65 g of ammonium cerium(IV) nitrate (Merck) are dissolved in this solution. The suspension in the flask is warmed to 42° C. The ammonium cerium(IV) nitrate solution is rapidly added to the suspension with vigorous stirring. After the addition of the ammonium cerium(IV) nitrate solution, the stirrer speed is immediately reduced so that the particles just remain in suspension. The mixture is stirred at this speed for 4 h. The suction-filter cake is subsequently washed with 3×125 ml of water, 5×100 ml of 1 M sulfuric acid/0.2 M ascorbic acid, 3×100 ml of demineralised water, 5×100 ml of 1 M NaOH, 3×100 ml of demineralised water, 3×100 ml of 1 M HCl and 3×100 ml of demineralised water on a 125 ml borosilicate 3.3 frit. The CHNS analysis of the dried product shows a sulfur content of 2.8% by weight.

Example 7

Static Protein Binding Capacity of a Strong Ion Exchanger Prepared in Accordance with the Description from Example 4

In order to determine the static protein binding capacity, the strong ion exchanger prepared in accordance with Example 4 is washed with a buffer mixture consisting of 25 mM phosphate and 25 mM acetate, adjusted to a pH of 5.0. 100 μl of gel are charged with 1 ml of a solution of 12.5 mg/ml of lysozyme in 25 mM phosphate and 25 mM acetate, pH 5.0, and incubated on a shaker for 120 min. The gel is subsequently washed with a buffer mixture comprising 25 mM phosphate and 25 mM acetate, adjusted to pH 5.0, in order to remove unbound lysozyme. Protein bound to the strong ion exchanger is eluted using a buffer mixture consisting of 25 mM phosphate, 25 mM acetate and 1 M NaCl, pH 7.0. The concentration of protein in the eluate is determined by means of UV absorption at 254 nm. A binding capacity of 67.3 mg of protein is obtained per ml of strong ion exchanger employed.

Example 8

Static Protein Binding Capacity of a Strong Ion Exchanger Prepared in Accordance with the Description from Example 5

In order to determine the static protein binding capacity, the strong ion exchanger prepared in accordance with Example 5 is washed with a buffer mixture consisting of 25 mM phosphate and 25 mM acetate, adjusted to a pH of 5.0. 100 μl of gel are charged with 1 ml of a solution of 12.5 mg/ml of lysozyme in 25 mM phosphate and 25 mM acetate, pH 5.0, and incubated on a shaker for 120 min. The gel is subsequently washed with a buffer mixture comprising 25 mM phosphate and 25 mM acetate, adjusted to pH 5.0, in order to remove unbound lysozyme. Protein bound to the strong ion exchanger is eluted using a buffer mixture consisting of 25 mM phosphate, 25 mM acetate and 1 M NaCl, pH 7.0. The concentration of protein in the eluate is determined by means of UV absorption at 254 nm. A binding capacity of 67.5 mg of protein is obtained per ml of strong ion exchanger employed.

Example 9

Static Protein Binding Capacity of a Strong Ion Exchanger Prepared in Accordance with the Description from Example 6

In order to determine the static protein binding capacity, the strong ion exchanger prepared in accordance with Example 6 is washed with a buffer mixture consisting of 25 mM phosphate and 25 mM acetate, adjusted to a pH of 5.0. 100 μl of gel are charged with 1 ml of a solution of 12.5 mg/ml of lysozyme in 25 mM phosphate and 25 mM acetate, pH 5.0, and incubated on a shaker for 120 min. The gel is subsequently washed with a buffer mixture comprising 25 mM phosphate and 25 mM acetate, adjusted to pH 5.0, in order to remove unbound lysozyme. Protein bound to the strong ion exchanger is eluted using a buffer mixture consisting of 25 mM phosphate, 25 mM acetate and 1 M NaCl, pH 7.0. The concentration of protein in the eluate is determined by means of UV absorption at 254 nm. A binding capacity of 57.6 mg of protein is obtained per ml of strong ion exchanger employed.

The invention claimed is:

1. A process for preparing a chromatography material, comprising
    a) dissolving a hydrophilic vinyl monomer in water, which is optionally mixed with further monomers,
    b) mixing the resultant solution with an organic, polymeric base material that is free from OH groups on the surface in such a way that 0.05 to 100 mol of total monomer are present per liter of sedimented polymer material,
    c) adding cerium(IV) salt dissolved in mineral acid to the resultant suspension, causing a pH of 0-5, and
    d) graft polymerizing the reaction mixture over a period of 0.5 to 72 hours.

2. A process according to claim 1, wherein the polymeric base material is a particulate polymer or shaped polymer which is prepared by polymerisation or copolymerisation of monomers selected from the group consisting of polyvinyl group-containing monomers, divinylbenzene, trivinylbenzene, divinyltoluene, divinylpyridine, divinylnaphthalene, ethylene glycol dimethacrylate, polyethylene glycol dimethacrylate, polypropylene glycol dimethacrylate, N,N-methylenebisacrylamide, N,N-divinylethyleneurea and N,N-divinylpropyleneurea, monovinyl group-containing monomers, glycidyl methacrylate, methyl methacrylate, ethyl methacrylate, propyl methacrylate, butyl methacrylate, methyl acrylate, ethyl acrylate, propyl acrylate, butyl acrylate, N-vinylpyrrolidone, N-methyl-N-vinylacetamide, acrylonitrile, chlorostyrene and aminostyrene.

3. A process according to claim 1, wherein the base material comprises particles having an average particle diameter in the range from 20 nm to 1000 μm.

4. A process according to claim 1, wherein the base material comprises particles having an average particle surface area in the range from 20 to 1200 $m^2/g$.

5. A process according to claim 1, wherein a base polymer in the form of a monolithic body is graft-polymerised.

6. A process according to claim 1, wherein the graft polymerisation is carried out in the presence of ammonium cerium (IV) nitrate as catalyst.

7. A process according to claim 1, wherein the Ce(IV) ion-catalysed reaction is carried out in the presence of at least one inorganic acid selected from the group consisting of nitric acid, sulfuric acid and hydrochloric acid.

8. A process according to claim 1, wherein the graft polymerisation is carried out in a protic solvent.

9. A method according to claim 8, wherein the solvent is water.

10. A process according to claim 1, wherein the base material comprises particles having an average particle surface area in the range from 100 to 600 $m^2/g$.

* * * * *